Feb. 6, 1951  C. W. COX  2,540,474
FILTRATION SYSTEM
Filed Oct. 31, 1947
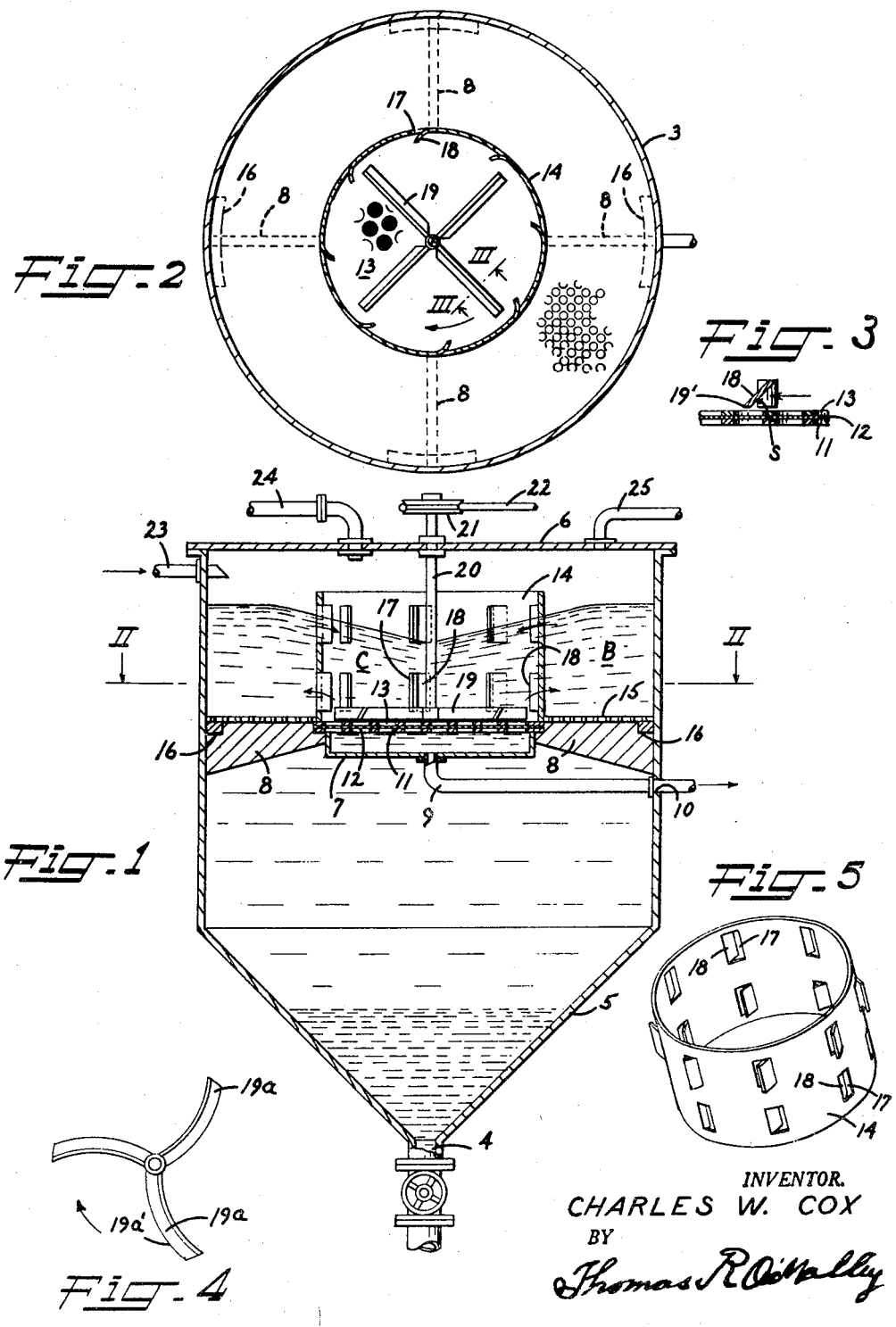
INVENTOR.
CHARLES W. COX
BY
Thomas R. O'Malley Patented Feb. 6, 1951

2,540,474

UNITED STATES PATENT OFFICE 2,540,474

FILTRATION SYSTEM

Charles W. Cox, St. Albans, W. Va., assignor to American Viscose Corporation, Wilmington, Del., a corporation of Delaware Application October 31, 1947, Serial No. 783,281

15 Claims. (Cl. 210—43)

This invention relates to a method and apparatus for filtering liquids and particularly for the filtration of suspensions of solid particles or fibers having gummy or adhesive characteristics such that they normally tend to foul the filter bed very quickly after the beginning of filtration and the deposition of the suspended particles on the filter bed.

It is a primary object of the present invention to provide a filtration system in which the filter bed remains in good filtering condition over indefinite periods of time and in which filtration can be effected substantially continuously over a long period of time. An ancillary object of the invention is to provide an improved filter of simple, inexpensive construction adapted to function in an efficient manner over long periods of time and requiring a minimum expenditure of time, labor, and materials for maintenance. Other objects and advantages of the invention will be apparent from the drawing and the description thereof hereinafter.

In the drawing—

Figure 1 is a cross-section in elevation of a preferred form of equipment adapted to carry out the invention, Figure 2 is a section on line II—II of Figure 1, Figure 3 is a section on line III—III of Figure 2, Figure 4 is an end view of a modified form of propeller or agitator, and Figure 5 is a perspective view of a modified form of partition.

In general, the present invention delivers the suspension of solid particles, whether fibrous or granular, to the filter bed by gravity, but the suspension in a shallow zone above the filter bed is impelled in a rotary fashion, and this rotary flow is accompanied with a component having a lifting effect and another component having a centrifugal effect upon sediment carried on the filter bed. This flow can be imparted to the suspension by a rotating agitator having blades disposed in a zone generally parallel to the filter bed but inclined so that the leading edge of the blade is closest to the filter bed. The rotation of such an agitator not only imparts a rotational flow to the suspension in the zone above the filter bed but the inclination of the blades produces a reduced pressure or suction immediately behind the blade which produces a lifting effect upon the sediment carried on the filter bed and the rotation produces a centrifugal force tending to sweep the sediment lifted from the bed outwardly therealong. This action which is continuously effected during filtration sweeps the bed of sediment to prevent accumulation beyond any desired predetermined thickness, keeping it in good filtering condition for the subsequent delivered suspension, and serves to transfer the sediment in the form of a relatively concentrated suspension to a region beyond the confines of the filter bed in which region the velocity of flow is reduced to allow a settling. The region immediately below the filter bed is separately enclosed to provide for the discharge of the filtrate and the zone above the filter bed is partially separated from the settling region beyond and surrounding such zone. However, intercommunicating passages are provided to facilitate the transfer of the relatively concentrated sediment from the zone above the filter bed into the settling zone with a reduction of velocity and turbulence in the latter zone while permitting recirculation of the suspension from an upper zone of the settling chamber back to the zone above the filter bed.

As shown in Figures 1 to 3, a preferred form of equipment may comprise a cylindrical vessel 3 having a discharge outlet 4 at the bottom thereof, which may be of conical form as at 5. The vessel may be open or it may be provided with a tightly fitted cover 6. The cover is preferably removable for servicing the system.

Within the vessel there is provided a cylindrical basin 7 which is preferably supported concentrically within the vessel 3 by a plurality of braces 8 forming a spider web between the vessel and the basin. A discharge conduit 9 is connected to the bottom of the basin 7 and passes through a sealed opening 10 in the side wall of the vessel 3. Upon the open top of the basin 7 there is secured a filter bed system which may comprise a lower perforated plate 11 which entirely encloses the basin 7 except for the perforations disposed within the limits of the wall of the basin. Any form of filter medium 12 may be disposed upon the lower plate 11 and an upper perforated plate 13 rests upon or is secured over the filter medium 12. The filter medium may be one or more layers of cloth, paper, felt, or it may consist of two or more layers of cloth or other fabric between the layers of which a granular filter medium may be disposed.

Upon the filter assembly there may be provided a cylindrical partition 14 which may rest upon the top plate 13. Around the partition 14, there may be a grillwork 15 either secured to the partition 14 so that it is carried thereby or carried upon cleats 16 on the inner wall of vessel 3 so that the grillwork in the latter case maintains the partition 14 in a stationary position of rest. The cylindrical partition 14 is provided with a plurality of openings 17 which may be formed by vanes or vane-like portions 18 struck-out from the wall of the partition. As shown, these portions are inclined so as to favor the passage of the liquid impelled therethrough by the agitator blades 19. As shown, two tiers of such struck out portions are shown, though it is to be understood that they could be replaced by a single circular row of openings which extend from adjacent the bottom to adjacent the top of the partition 14 to provide outlet passages for the suspension at the bottom and inlet passages for the suspension at the top of the partition 14. An impeller or agitator comprising a plurality of blades 19 is carried by a shaft 20 for rotation therewith. The impeller or agitator system may be supported by the cover 6 when such a cover is used and is driven by means of a pulley 21 and a belt 22. Preferably, the blades 19 of the impeller are spaced just above the upper plate 13 of the filter bed system to minimize wear and power consumption during the rotation thereof, though the blades 19 could be rotated in direct contact with the upper surface of the plate 13 if so desired. As shown in Figure 3, the leading edge 19' of the agitator blade 19 is in close proximity to the plate 13 and the blade slopes back and up from such leading edge so that during rotation thereof, there is a tendency to produce a reduced pressure back of the leading edge at 8. The angle of inclination of the blade 19 from the leading edge 19' may vary widely though an angle of approximately 45° is shown.

The suspension to be filtered may enter either through an inlet conduit 23 which introduces the suspension into an outer and upper peripheral zone within the vessel 3, or it may be introduced by an inlet conduit 24 which extends into an upper inner zone of the vessel 3, or the suspension may be introduced simultaneously or alternately through both connections. In certain instances discussed hereinbelow, it may be desirable to introduce suspensions of different concentration but of the same solid matter separately and simultaneously through the conduits 23 and 24, or they may be introduced separately but at alternate intervals through such conduits. A conduit 25 through the cover 6 may be provided to be connected to a source of high pressure fluid such as compressed air or any liquid such as water or the particular solvent or suspension liquid undergoing filtration. The use of such a high pressure fluid increases the speed of filtration and may be desirable in many systems.

While the embodiment in Figures 1 to 3 shows a four-bladed propeller in which the blades extend in a substantially radial direction, Figure 4 illustrates a modification in which blades 19a are of arcuate form and the blades are inclined upwardly and backwardly from the leading edge 19a'. Figure 5 shows a modification of the partition 14 in which the upper vanes 18 project outwardly from the partition in order to favor the flow of the recirculating suspension back into zone C above the filter bed.

The system of the present invention may be employed for the filtration of a wide variety of suspensions and is particularly advantageous when the suspended matter is of such a sticky, glutinous or gummy character that the pores of the conventional filter system would normally become clogged very quickly. An example of such a suspension is that obtained from the soaking of cellulose in caustic soda solutions whereby hemicellulose and other foreign matters including matter of a fibrous character are present in the form of a more or less colloidal suspension. Such a colloidal suspension is formed during the mercerization of cellulose especially in the rayon and cellophane industries and it is generally desirable to recover the sodium hydroxide for subsequent reuse.

In operation of the filter, the suspension to be filtered is introduced either through conduits 23 or 24 or both and flows through the apertures 17 in the upper part of the cylindrical partition 14 which separates the region within vessel 3 above the level of the filter bed and grid 15 into a central zone C above the filtering bed and an outer annular zone B above the grid. The agitator blades 19 impart a rotational flow to the body of the suspension in a zone, more or less shallow, which is above the filter bed system. Because of the inclination of the blades 19, their rotation imparts a pulsating flow tending to lift the sediment away from the filter bed system and out of the openings in plate 13. Furthermore, the rotation imparts a centrifugal force acting upon the lifted particles which, of course, after lifting form a relatively concentrated suspension in the zone of rotational flow. This centrifugal force directs the relatively concentrated suspension out through the lower openings 17 into the relatively quiescent annular zone B where settling is allowed to occur. The grid 15 favors settling in any part of the suspension just above it and maintains a more quiescent zone therebeneath, by virtue of its frictional effect reducing the velocity of flow of the suspension adjacent thereto. In settling, the particles fall through the openings in the gridwork 15 and ultimately collect at the bottom of the vessel 3 from which they may be discharged continuously or intermittently through the conduit 4. The relatively concentrated suspension in the upper part of the settling zone B flows back through the upper set of openings 17, thus recirculating down to the filter bed with any additional suspension introduced through conduits 23 and/or 24. During this continuous hydraulic sweeping of the sediment from the filter bed system, filtrate is continuously withdrawn through the conduit 9.

The filter system thus provides a self-cleaning system which does not interfere with the continued operation of the equipment. Because of the reduction of turbulence within the suspension as it passes from within the partition 14 out into the settling chamber B, a rapid and effective settling occurs in the region beyond the confines of the filter bed system and a suspension of relatively low concentration is recirculated or returned to the zone above the filter bed to join additional suspension to be filtered. The facility for recirculation is quite important in that it allows the less concentrated suspension left above grid 15 after settling to be continually and quickly displaced and replaced by more concentrated suspension impelled out from the zone above the filter bed. The utilization of high pressure within the chamber by connecting conduit 25 to a source of pressure fluid does not interfere with this self-cleaning action of the propeller system and, consequently, the system is fully as effective when used as a pressure system as it is when used as a simple gravity system.

It is to be understood that changes and variations may be made without departing from the spirit and scope of the invention as defined in the appended claims.

I claim:

1. The method of filtering suspensions of solid particles in liquids comprising the steps of delivering the suspension to a filter medium and imparting to the suspension in a zone above the filter medium during filtration therethrough a rotary flow which centrifugally forces the suspension to pass outwardly beyond the bounds of the filter medium, reducing the velocity of the suspension in a settling chamber beyond the filter medium, allowing settling to occur in said chamber, and passing the suspension remaining after at least partial settling from an upper region of the settling chamber back to the zone above the filter medium, and removing the filtrate from a confined zone beneath the filter medium.

2. The method of filtering suspensions of solid particles in liquids comprising the steps of delivering the suspension to a filter medium and imparting to the suspension in a zone above the filter medium during filtration therethrough a rotary flow comprising a component having a lifting effect and another having a centrifugal effect upon particles settled upon the filter medium thereby forcing the suspension to pass outwardly to a settling chamber beyond the bounds of the filter medium, reducing the velocity of the suspension in the chamber and allowing settling to occur in said chamber, and removing the filtrate from a confined zone beneath the filter medium.

3. The method of claim 2 in which the suspension remaining after at least partial settling is continuously passed from an upper region of the settling chamber back to the zone above the filter medium.

4. Filtering apparatus comprising a vessel, means for introducing a liquid to be filtered into the vessel, supporting means in the vessel, a filter medium in the vessel carried by the supporting means and having its outer periphery spaced inwardly from the wall of the vessel, partition means above the filter extending therearound adjacent its periphery for partially separating the zone above the filter medium from the region thereabout, a propeller within the partition means disposed in a lower portion of the zone above the filter medium, means for rotating the propeller, a plurality of circumferentially spaced passages through the partition means to provide intercommunication between the zone above the filter medium and the region thereabout, and means beneath the filter medium for confining and withdrawing filtrate therefrom.

5. Filtering apparatus comprising a vessel, means for introducing a liquid to be filtered into the vessel, supporting means in the vessel, a filter medium in the vessel carried by the supporting means and having its outer periphery spaced inwardly from the wall of the vessel to provide a generally annular region thereabout, partition means above the filter extending therearound adjacent its periphery for partially separating the zone above the filter medium from the region thereabout, a propeller within the partition means disposed in a lower portion of the zone above the filter medium, means for rotating the propeller, a plurality of circumferentially spaced passages through the partition means to provide intercommunication between the zone above the filter medium and the region thereabout, and means beneath the filter medium for confining and withdrawing filtrate therefrom.

6. Filtering apparatus comprising a vessel, means for introducing a liquid to be filtered into the vessel, supporting means in the vessel, a filter medium in the vessel carried by the supporting means and having its outer periphery spaced inwardly from the wall of the vessel to provide a generally annular region thereabout, partition means above the filter extending therearound adjacent its periphery for partially separating the zone above the filter medium from the region thereabout, a propeller within the partition means disposed in a lower portion of the zone above the filter medium, means for rotating the propeller, a plurality of circumferentially spaced passages through the partition means to provide intercommunication between the zone above the filter medium and the region thereabout, said passages adjacent the propeller being formed beside inwardly projecting vanes arranged to favor discharge of the suspension through the passages as the propeller rotates, and means beneath the filter medium for confining and withdrawing filtrate therefrom.

7. Filtering apparatus comprising an upright cylindrical vessel, means for introducing a liquid to be filtered into the vessel, supporting means in the vessel, a circular filter bed disposed generally centrally within the vessel carried by the supporting means and with its outer periphery spaced inwardly from the wall of the vessel to provide an annular region thereabout, a generally concentrically disposed partition extending inwardly from adjacent the outer periphery of the filter bed, a propeller adjacent the filter bed within the partition rotatably mounted on a vertical axis, means for rotating the propeller, a plurality of circumferentially spaced passages through the partition, some of the passages having portions in the lower part of the partition adjacent the propeller and some of the passages having portions in an upper part of the partition, and means beneath the filter medium for confining and withdrawing filtrate therefrom.

8. Filtering apparatus in accordance with claim 4 in which the propeller has inclined blades with the leading edge lowermost.

9. Filtering apparatus in accordance with claim 7 in which the propeller has inclined blades with the leading edge lowermost.

10. Filtering apparatus in accordance with claim 7 in which the passages adjacent the propeller are formed beside inwardly projecting vanes arranged to favor discharge of the suspension through the passages as the propeller rotates.

11. Filtering apparatus in accordance with claim 10 in which the vanes and openings are formed of portions struckout from the partition.

12. Filtering apparatus in accordance with claim 10 in which the passages in the upper part of the partition are formed beside outwardly projecting vanes inclined to favor return flow of the suspension into the space within the partition.

13. Apparatus in accordance with claim 4 comprising a closed receptacle beneath and open to the filter bed to receive filtrate.

14. Apparatus in accordance with claim 7 comprising a closed receptacle beneath and open to the filter bed to receive filtrate.

15. Filtering apparatus in accordance with claim 14 comprising an annular grillwork extending between the bottom of the partition and the wall of the vessel.

CHARLES W. COX.

(References on following page)

REFERENCES CITED

The following references are of record in the file of this patent:

UNITED STATES PATENTS

| Number | Name | Date |
|---|---|---|
| 504,434 | Hunt | Sept. 5, 1893 |
| 871,046 | Savage | Nov. 12, 1907 |
| 1,505,898 | Kirby | Aug. 19, 1924 |
| 1,784,132 | Cabrera | Dec. 9, 1930 |
| 2,089,702 | Lomax | Aug. 10, 1937 |
| 2,245,588 | Hughes | June 17, 1941 |

FOREIGN PATENTS

| Number | Country | Date |
|---|---|---|
| 537,498 | Great Britain | June 25, 1941 |